United States Patent [19]

Van Noten

[11] Patent Number: 4,468,536
[45] Date of Patent: Aug. 28, 1984

[54] WRAPAROUND CLOSURE

[75] Inventor: Lodewijk Van Noten, Louvain, Belgium

[73] Assignee: N.V. Raychem S.A., Kessel-lo, Belgium

[21] Appl. No.: 483,017

[22] Filed: Apr. 7, 1983

[30] Foreign Application Priority Data

Apr. 8, 1982 [GB] United Kingdom ................ 8210572

[51] Int. Cl.³ ............................................ H02G 15/18
[52] U.S. Cl. ................................. 174/92; 174/21 R; 174/DIG. 8; 428/36
[58] Field of Search ................ 174/21 R, 92, DIG. 8; 428/36

[56] References Cited

U.S. PATENT DOCUMENTS

| 3,427,392 | 2/1969 | Plummer | 174/21 R |
| 4,084,066 | 4/1978 | Gillemot | 174/92 |
| 4,142,592 | 3/1979 | Brusselmans | 174/92 |
| 4,181,775 | 1/1980 | Corke | 174/DIG. 8 X |
| 4,241,119 | 12/1980 | Smart | 174/DIG. 8 X |

FOREIGN PATENT DOCUMENTS

| 1155470 | 6/1969 | United Kingdom . | |
| 1431167 | 4/1976 | United Kingdom | 174/DIG. 8 |
| 2040106 | 8/1980 | United Kingdom | 174/DIG. 8 |
| 2059873 | 4/1981 | United Kingdom . | |
| 2069773 | 8/1981 | United Kingdom | 174/92 |
| 2085674 | 5/1982 | United Kingdom . | |
| 2101505 | 1/1983 | United Kingdom . | |

Primary Examiner—G. P. Tolin
Assistant Examiner—Morris H. Nimmo
Attorney, Agent, or Firm—T. Gene Dillahunty; Herbert G. Burkard; Douglas A. Chaikin

[57] ABSTRACT

A wrap-around sleeve for enclosing a cable join has opposing edge portions which can be held together to maintain the sleeve in a wrapped configuration. An adhesive coated flap lies under the edge portions to form a seal between them. When the enclosure is to be re-entered, a central part of the sleeve is cut away, and a new sleeve installed to bridge the butts of the old sleeve which are allowed to remain on the cable. In order to avoid leak paths between the edge portions of the remaining butts, adhesive from the flap is allowed to flow between the edge portions on original installation. This is achieved by providing localized separation between the original edge portions.

8 Claims, 4 Drawing Figures

WRAPAROUND CLOSURE

This invention relates to an arrangement for providing a closure around an elongate substrate, particularly, though not exclusively a splice between telecommunications cables.

It is known to use recoverable articles to enclose telecommunications cable splices, and such articles may, for example, comprise a wraparound sleeve at least a portion of which is heat-recoverable, closed by a suitable closure means.

A heat recoverable article is an article the dimensional configuration of which may be made substantially to change when subjected to heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086, 242 and 3,957,962. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point, or, for amorphous materials, the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other recoverable articles, as described, for example, in British Pat. No. 1440524 equivalent to U.S. Pat. No. 4,035,534, an elastomeric member such as an outer tubular member is held in a stretched state by a second member, such as an inner tubular member, which, upon suitable treatment weakens and thus allows the elastomeric member to recover.

A wraparound closure is disclosed in British Pat. No. 1155470 to U.S. Pat. No. 3,455,336 which, together with other patent specifications referred to is incorporated herein by reference. In such an enclosure, a wraparound sleeve is formed as an elongate sheet or split tube and then wrapped around the cable. The sleeve has two upstanding rails that may be secured together in abutment by a closure channel, made for example from stainless steel. One of the rails is usually located at one longitudinal edge of the sleeve while the other rail may be spaced from the other edge of the sleeve, the sleeve portion between said other rail and its adjacent sleeve edge forming a longitudinal flap that extends beneath the abutting rails. The flap thereby helps to provide environmental sealing beneath the abutment of the rails. Reference to rails is not intended to specify any particular cross-sectional shape, merely the capability of securement by a channel or clips of the type used in this art.

In some instances it is advantageous to fabricate the sleeve without an integral flap, and accordingly, in another form of wraparound closure arrangement the flap is provided as a discrete sealing member.

A problem to be overcome with closure arrangements employing wraparound sleeves is that of leakage or contamination along the rails after re-entry and re-sealing. Where the original sleeve is recoverable a tent-shaped void is formed between the rails due to tension in the sheet on recovery. In order to re-enter the sleeve, the rails plus channel are cut off and centre section of the sleeve removed. A new sleeve is then recovered around the two remaining butts of the old sleeve, and in order to get good sealing the butts must present a closed circumference to the new sleeve; this circumference will, however, be broken by the void between the remnants of the old rails. We have found that this void is best not prior filled with sealant since this makes installation of the channel difficult.

A way of overcoming the problem by allowing flow of sealant from within the closed sleeve into the void, is disclosed in our co-pending UK patent application No. 8118362, equivalent to U.S. Pat. No. 4,436,566. This earlier case provides a recoverable polymeric article for use as a wraparound sleeve, having a first upstanding rail adjacent one edge thereof, and a second upstanding rail spaced from another edge such that the portion of material between the second rail and the other edge is a flap which can underlie the rails when the sleeve is in use; the sleeve at the base of the first rail or the flap having means (preferably ridges or depressions in the flap) which, on recovery of the sleeve, allows passage of sealant on a surface of the sleeve into the region between the first rail, the second rail and the flap. The sheet is preferably pre-coated on its side remoted from the rails with the sealant, although sealant can be added on site.

To summarise, hoop stresses arising on recovery of the sleeve cause the base of the rails to part while the upper parts of the rails remain held together by the channel. It was surprisingly discovered that adhesive cannot in normal circumstances flow into the void between the base and the rails due to the seal that is produced by the base of the first rail being forced into contact with the integral flap. It was also discovered that deformation in the flap can allow flow of adhesive across the flap and into the void, because the seal referred to is interrupted.

The present application is also concerned with re-entry and resealing of a splice case or other enclosure and with the avoidance of a leak path between the remnants of the rails on the butts of the old sleeve. In particular, the concern now is with a way of ensuring that this seal can be achieved on a non-recoverable sleeve, or on a sleeve being only slightly recoverable or recoverable only at its ends In such sleeves, the longitudinal edges which abut when the sleeve is wrapped around a substrate are conveniently sealed by a discrete internal sealing member rather than one which is integral with the sleeve. Where the sleeve is non-recoverable some other means must be provided to force the sealing member against the overlying sleeve edges to bond and to form the required seal. A foam strip attached to the underside of the sealing member has been found to give good results. This is disclosed and claimed in UK patent publication No. 2085674.

A sleeve which is not recoverable does not have to meet the forces which would result from recovery, and in particular does not tend to pull apart at the closure mechanism on recovery. As a result the abutting edges can be maintained in close contact during installation, which may involve melting of a hot-melt coating and bonding of the internal sealing member across the base of the rails. Once installation is complete and the hot-melt, for example, has re-crystallised, the enclosure can be pressurized since stresses in the sleeve are then taken by the bonded sealing member and not by the closure mechanism which held the sleeve during installation.

In spite of these considerations it is difficult to get the edges of the sleeve to match sufficiently well that the rails can be removed, without exposing a gap that impairs the effectiveness of a new sleeve when shrunk over the butts of the old sleeve.

This problem has now been overcome by deliberately preventing close matching of the edges of the sleeve especially at those positions where sealing between the edges is required in order to allow for the re-entry and resealing technique outlined above, or to allow emergence of adhesive to act as a temperature indicator.

Thus, the present invention provides a closure assembly comprising:

a wrap-around sleeve having edge portions which can abut to hold the sleeve in a wrapped configuration;

a sealing member, which can underlie and bridge the edge portions when abutting, and which has a heat softenable sealant on a major surface facing the edge portions; and means which provides localized separation between the edge portions allowing only localized flow between them of said sealant when heat-softened during assembly of the sleeve The edge portions which abut when the sleeve is in its wrapped configuration are preferably upstanding protruberances each having a longitudinal under-cut region, in order that a channel, which may be C-shaped in cross-section, may be alid over them to hold them together. This type of closure mechanism is disclosed in UK patent specification No. 1155470, equivalent to U.S. Pat. No. 3,455,336. The two protuberances when together preferably have the shape of a rail, and for this reason are referred to as rails. Although other arrangements are suitable the present invention will be described with reference to a closure mechanism involving rails and a channel.

In spite of the general desirability of holding the rails tightly and uniformly together, what we have discovered is that localized interruption to otherwise neatly abutting rails can provide better sealing between them in the critical region where a new sleeve may have to be installed. The means by which localized separation of the rails is achieved in preferably one or more holes in a substantially radial direction relative to the sleeve through the rails where they abut. Such holes may be most simply provided by manufacturing the sleeve in tubular form with a single longitudinal protruberance, drilling holes through this protruberance at appropriate places, and longitudinally splitting the protruberance to produce a split sleeve with rails at opposing edges.

Alternatively, the rails of a split sleeve could be held together and holes then drilled.

In either case the hole as it appears in the abutting rails will be formed from matching grooves in each rail. A further possibility, is for each groove to extend into only one rail, and being open towards the other rail. A series of such grooves could be provided in one of the rails, or some grooves could be in one rail and some in the other rail. Where the holes are formed from matching grooves in each rail, it may be desirable to space the holes apart at progressively different intervals in order to compensate for any longitudinal misalignment of the rails on assembly of the closure. Thus, if the diameter of each holes is d, then adjacent holes may be spaced apart by distances d, ¾ d, ½ d, ¼ d and so on, to ensure that at least one pair of matching grooves are correctly mated to form a hole.

It is preferred that the holes extend from the inside of the sleeve through the whole thickness of the rails, in order that air displaced by the softened adhesive as it flows into the holes can be discharged or that adhesive may be discharged to act as a temperature indicator.. This will not be necessary in all cases since the distance that the adhesive must flow to provide a seal for re-entry is not large: it need flow into the holes in the rails a distance approximately equal to the thickness of the sleeve since this will be the maximum depth of the void if the rails are later cut off flush with the surface of the sleeve. As a result the hole may lie within one rail and be open to the other rail only at the base of the rails, the hole running obliquely through the rail as seen in cross-section.

Although the position of the means for providing localized separation will be discussed with reference to the accompanying drawings, the desirability of localizing the opportunity for adhesive flow will be considered now. The greater part of the length of the rails can be shaped for precise abutment and for precise accommodation of the channel. This results in a better quality and stronger closure, which is unlikely to become displaced while the final stages of installation, such as heat-activation of an adhesive, are carried out. Furthermore, if substantially no movement between the rails occurs during installation, a better seal of any underlying flap across the base of the rails is likely to be achieved. This is because any movement here during the last stages of re-crystallisation of the adhesive preferably used in this area may result in cohesive or adhesive failure.

A second advantage of the localization of adhesive flow between the rails is noticed when re-entry is carried out. The first step to be carried out is generally removal of the rails and channel. This is done simply by cutting them away from the surface of the enclosure. This job is much easier if the blade or other cutter has to sever only the rails from the sleeve and does not have to cut through a ridge of adhesive running the entire length of the rails.

In designing an enclousre according to the present invention for a particular use, the following quantities should be taken into consideration:

The hydrostatic pressure which will be available to urge the adhesive between the rails, the hydrostatic resistance to flow exhibited by the adhesive, and the size of the localized separations between the rails.

The pressure on the adhesive can result from the shrinkage forces of the sleeve, or as is preferred, from a foam strip or other urging means situated radially inwardly of the sealing member which underlies or bridges the abutting edges of the sleeve. This foam strip will generally be supported on a rigid internal support liner or cage, and will be compressed as the sleeve is closed around that support. It is preferred that the sleeve is easy to close, and this sets an upper limit on the force that the foam strip can provide.

The viscosity of the adhesive must of course be considered at the temperature that it will experience during installation, but attention must also be paid to the performance of the adhesive over the temperatures that the final product must withstand. It will be useful for the closure to have recoverable end portions which can be recovered into contact with the substrate that it is desired partially to enclose. Such recovery can be by heat, and the temperature required puts a restriction on the range of temperatures over which the adhesive must have the chosen viscosity. If the desirable flow of adhesive between the rails is increased by employing an adhesive with a lower viscosity at a lower temperature, then the enclosure may perform less well in the temperature cycling or other tests by which it will be judged.

The designer will therefore choose the pressure available for pumping the adhesive according to the ease with which the sleeve must be installed; choosing the adhesive according to the performance tests his product must pass in conjunction with a recovery temperature if relevant; and finally choose the size of the localized separations between the rails to produce a satisfactory flow of adhesive on installation.

The following data gives examples of the way that these three factors interact. The figures are only illustrations and the relationship between them is fixed by the requirement that the softened adhesive flows, upon assembly of the sleeve, only into the localized separation. For any given adhesive viscosity and for any given pressure the size of the localized separation is fixed relative to the permitted gap that may be allowed to develop between the rails.

The supply of adhesive which is to flow into the holes preferably comprises a thick, at least 0.5 mm layer of adhesive on the flap. Preferably the adhesive layer is from 1.0 to 2.5 mm thick, for example 1.5 mm. The flap is preferably discrete since this allows adhesive to be positioned squarely below the holes. This is less easy with an integral flap where the supply of adhesive would be to one side of the rails. It is, in any case, usual not to coat integral flaps with adhesive since this can make assembly difficult.

The adhesive should have a high enough viscosity at ambient temperatures for it to remain, for example, on the flap during installation. It must also be able to be softened when the sleeve has been secured in the wrapped configuration to allow it to flow into the holes between the rails. Although this softening is necessary, a phase change need not occur and therefore mastics can be used as alternatives to the preferred hot-melt adhesives. Preferably the viscosity of the adhesive when heat-softened during assembly of the sleeve is from 5 to 15 K Pa.

The present invention is particularly suitable as a case for a telecommunications cable splice, in particular one which is to be pressurized to prevent water vapour ingress.

Where such a splice case is to be pressurised it may be desirable to use what have become known as V-seals in order to put the adhesive bonding the sleeve to the cables out of the peel. These V-seals, which are flexible strips of materials generally V-shaped in cross-section, are positioned within the splice case at the region where the sleeve meets the cables, and present a concave surface to the pressure within the splice case. They are mentioned here because they are desirably also employed around the butts of the old sleeve when re-entry and resealing with a new sleeve is carried out. They should be placed around the butts a short distance inwardly of the adhesive filled holes in the rails. The technique is described and claimed in UK patent publication No. 2040106, equivalent to U.S. Pat. No. 4,409,426.

A further feature of many splice cases, and of particular interest here, is the use of an internal support. Such supports are wrapped around the substrate to be enclosed before the sleeve is installed. The liner can provide mechanical protection and act as a heat or moisture vapour barrier. In this instance it may also act as a support for the foam backed flap whose function is not only to seal the rails but also to force the adhesive into the holes. The support may be, for example, a cardboard or plastics based liner as disclosed respectively in UK patent publication No. 2059873, equivalent to U.S. Pat. No. 4,380,686 and No. 2069773. Alternatively, it may comprise two metal half-shells as in UK Pat. No. 1431167 equivalent to U.S. Pat. No. 4,142,592 or a cage having means for proper location of the sleeve.

The invention will now be further illustrated, by way of example, with reference to the accompanying drawings, in which.

Figure 1:
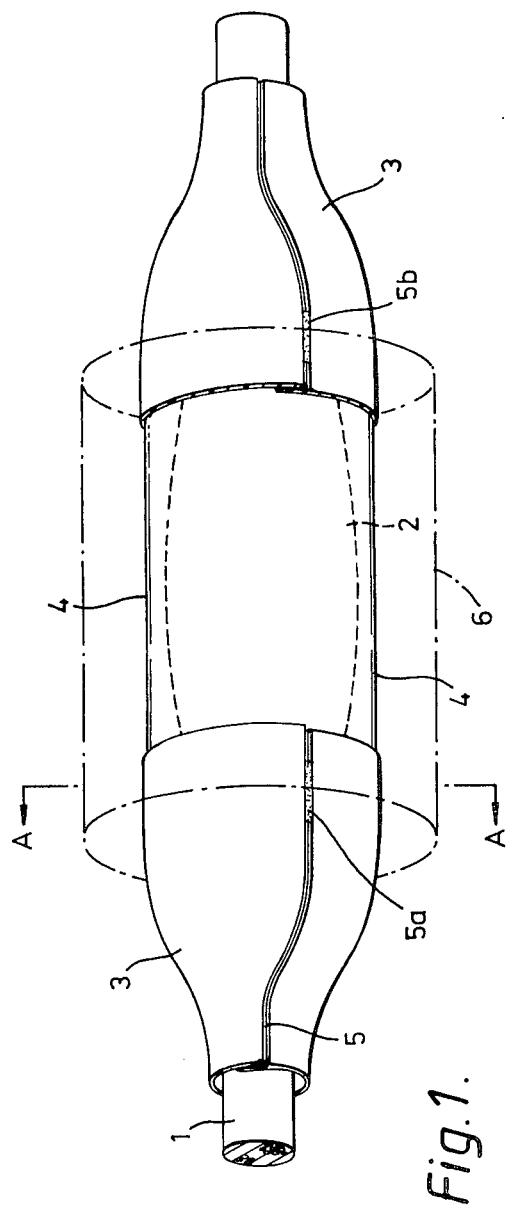
FIG. 1 shows the preferred technique of re-entry and re-sealing of a splice case.

In FIG. 1 a wrap-around sleeve 3 surrounds a splice 2 between cables 1. The splice 2 is surrounded by a liner 4 to protect the splice and to provide a pleasing regular appearance to the sleeve 3. The rails and the channel have been removed, and the remnants of the rails are shown at 5.

At two regions (5a, 5b) along the rail remnants 5 is shown adhesive filling that provides the smoother curved sleeve perimeter onto which a new sleeve 6 can be shrunk.

Figure 2:
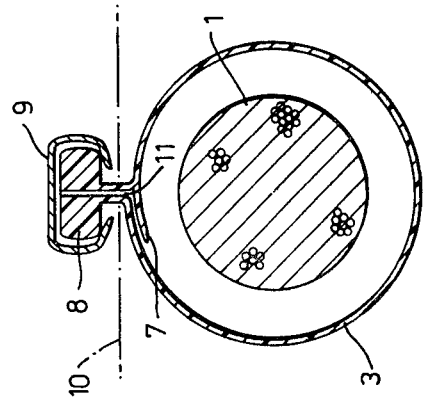
FIG. 2 shows a cross-section of a splice case.

A known wrap-around closure is shown in FIG. 2. A sleeve 3 with integral flap 7 is held closed by rails 8 and channel 9. Line 10 indicates where the rails would be cut during re-entry, and a void 11 is shown between them. It is these voids which must be filled if a new sleeve can be shrunk around the butts of the old sleeve without unacceptable leak paths.

Figure 3:
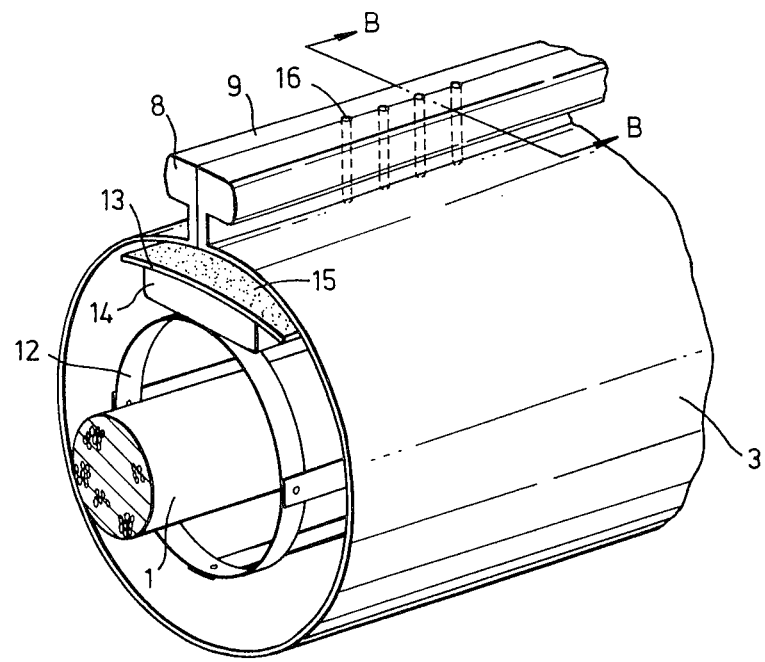
FIG. 3 is a perspective view of one embodiment of the invention.
Figure 4:
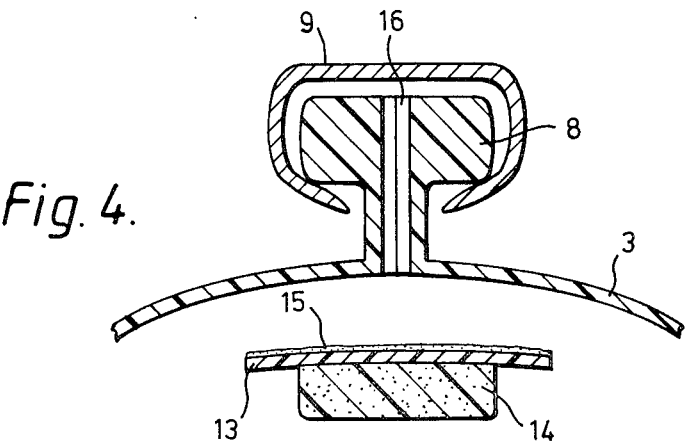
FIG. 4 is a cross-section of the rail area of a sleeve embodying the invention.

FIGS. 3 and 4 illustrate an embodiment of the invention where the means which provides localized separation between the rails is a series of radial holes 16. A set of holes will be positioned at positions 5a and 5b of FIG. 1. The number of holes in each set will depend on the length of seal required. In general, the minimum sealing length at each end of the closure is at least 10 mm. The number of holes can vary from 1 to 10 but is preferably from 2 to 6, for example 4. The sizes of the holes, discussed above, depends on the force available to displace the adhesive and on the viscosity of the adhesive. The holes may be any convenient shape, for example round or elliptical, but preferably have a diameter, measured in the rail direction, of at least 1.0 mm, more preferably from 2 to 10 mm, for example 3 to 4.5 mm. The width of the holes, transverse to the rail direction is desirably at least 0.5 mm, preferably from 1 to 4 mm, for example 1.8 mm.

Also shown in FIG. 3 is an internal support in the form of a cage 12. The cage has end rings and longitudinal bars connecting the end rings. A sealing member or flap lies on one of these longitudinal bars. The flap shown consists of a strip of plastic material 13 coated on its upper surface with a hot-melt adhesive 15 and an underlying foam strip 14 The function of the foam strip is to urge the strip 13 radially outwards to seal across the base of the rails 8 and to force the adhesive 15 between the rails at the positions where they are locally separated. Preferably the pressure applied to the adhesive to force it between the rails is from 150 to 2000 Pa.s.

The holes 16 which locally separate the rails are shown also in FIG. 4. Since a discrete flap 13 can directly underlie and bridge the base of the rails 8, a good flow of adhesive into the holes can be ensured. In FIG. 4 the hole 16 is shown to be partly in one rail and partly in the other. An alternative is to shift the hole to one side (while keeping it vertical as drawn) so that it is only in one rail but is open towards the other rail. As a further possibility the hole could be oblique (instead of vertical as drawn) and run from the base of one of the rails into the thickness of the rail, providing the hole was open to the other rail at the base of the rails.

I claim:

1. A closure assembly comprising:
   a wrap-around sleeve having edge portions which can abut to hold the sleeve in a wrapped configuration;
   a sealing member which can underlie and bridge the edge portions when abutting, and having a heat softenable sealant on a major surface facing the edge portions;
   urging means inside said sleeve bearing on said sealing member for applying pressure on the sealant when heat softened; and
   means which provides localized separation which extends from the inside of the sleeve through the abutting edge portions and extends between the abutting edge portions allowing only localized flow between them of said sealant when heat softened.

2. An assembly according to claim 1, in which the means which provides separation between the edge portions is at least one groove in an edge portion which defines a hole between the edge portions when abutting, the hole being substantially radial with respect to the wrapped sleeve.

3. An assembly according to claim 1, in which the sealant is a hot-melt adhesive.

4. An assembly according to claim 1, in which the urging means is a foam strip on a side of the sealing member opposite the sealant.

5. An assembly according to claim 1, which additionally comprises a support around which the sleeve is wrapped.

6. An assembly according to claim 1, in which the sleeve is at least partly recoverable.

7. An assembly according to claim 6, in which the sleeve is at least partly heat shrinkable.

8. An assembly according to claim 6, in which end portions only of the sleeve are recoverable.

* * * * *